UNITED STATES PATENT OFFICE 2,527,798

BASIC FLUORENYL KETONES AND CARBINOLS AND THE PRODUCTION THEREOF

John W. Cusic, Skokie, Ill., assignor to G. D. Searle & Co., Skokie, Ill., a corporation of Illinois No Drawing. Application August 15, 1947,
Serial No. 768,927

13 Claims. (Cl. 260—570.5)

This invention relates to fluorene compounds having in the 2-position aminoalkyl radicals bearing oxygen substituents, and to processes for preparing the same. In particular it relates to compounds having the general structural formula

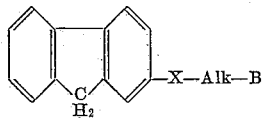

wherein B is an aliphatic-type organic amino group, Alk is an alkylene radical, and X represents a methylene group bearing an oxygen function such as an oxo or oxy radical.

I have discovered that compounds of the above general type are useful pharmacetutical agents, having general utility as antispasmodic, antihistaminic and local and topical anesthetic agents. In the above general formula, the organic amino radical, B, represents an amino radical derived from a primary or secondary alphyl amine of the aliphatic and aliphatic-heterocyclic series. Alphyl amines are amines which are aliphatic in character and include amines such as the mono- and dialkylamines, hydroxyalkylamines such as ethanolamine, N-ethylethanolamine and N-methylethanolamine, aralkylamines such as benzylamine, phenethylamine, and methylbenzylamine, the simple aliphatic-type heterocyclic amines such as piperidine, morpholine, pyrrolidine, thiamorpholine and alkyl derivatives of these amines, as well as aliphatic cyclic amines such as cyclohexylamine, cyclopentylamine, and the like. The alphyl amino groups, B, which are within the purview of this invention are derived from strong organic bases having ionization constants in the range of $10^{-3}$ to $10^{-6}$. The alkylene radicals represented by Alk are bivalent radicals derived from aliphatic hydrocarbons and are exemplified by the ethylene, propylene, trimethylene, butylene and amylene radicals. The grouping X represents a carbonyl or carbinol group.

Representative compounds of the type to which this invention pertains are illustrated hereinbelow.

(1) 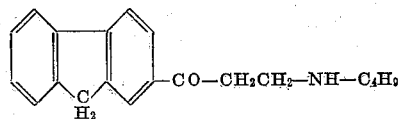

(2) 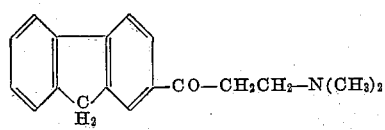

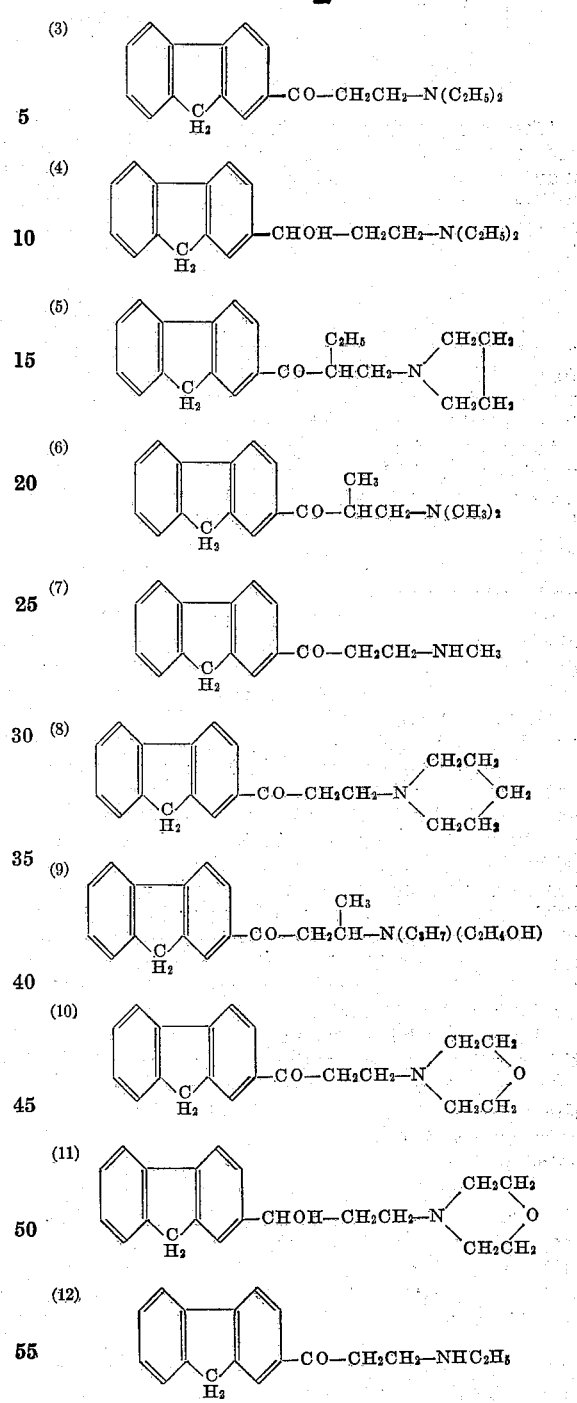

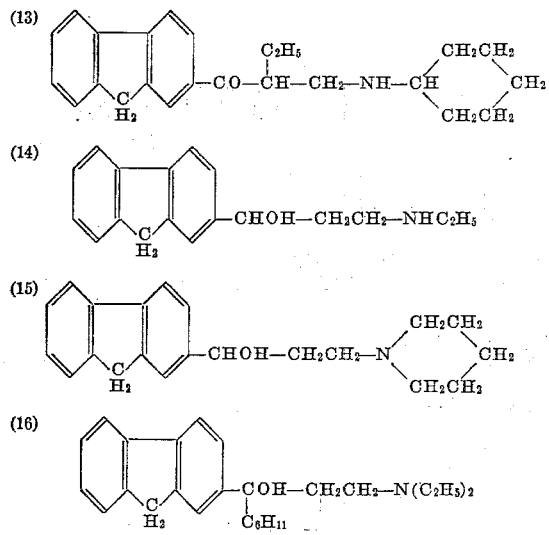

The compounds of this invention are made by reacting an alkyl 2-fluorenyl ketone with a primary or secondary alphyl amine or amine salt in the presence of a source of formaldehyde such as formalin, formaldehyde or paraformaldehyde in an organic solvent, preferably an aliphatic alcohol such as ethanol, isopropanol or isoamyl alcohol. In general the preferred method is to dissolve 1 mole of an alkyl 2-fluorenyl ketone, about 1.2 to 1.5 moles of formaldehyde (as paraformaldehyde) and about 1.2–1.5 moles of an aliphatic primary or secondary amine hydrohalide in a suitable amount of aliphatic alcohol. The mixture is refluxed for a short period of time, varying from ¼ hour to several hours. By this procedure the 2-(aminoalkanoyl)-fluorene salt is formed directly, and may be isolated by chilling and filtration. If desired, the organic base can be isolated by treating the mixture with alkali and extracting it with organic solvent.

The oxo group of the compounds obtained as above can be converted to a hydroxy group by reduction. A preferred method of reduction is by catalytic hydrogenation in an organic solvent such as an alcohol, using as a catalyst platinum or other noble metal, or nickel. Chemical methods of reduction are also suitable, as for example with aluminum isopropoxide or with zinc amalgam and hydrochloric acid. The oxo group may also be converted to a carbinol group by reaction with an organometallic compound such as a Grignard reagent or an organosodium or organolithium complex. Among such reagents are phenylmagnesium bromide, phenylsodium, cyclohexylmagnesium bromide, butyllithium, ethylmagnesium bromide, methylmagnesium iodide, anisylmagnesium bromide and the like.

The organic bases of the type contemplated in this application are soluble in common organic solvents but generally insoluble in water. For the purpose of water solubility, they are preferably converted to salts with organic and inorganic acids, such as sulfuric, phosphoric, citric, tartaric, sulfamic, lactic, acetic, malic, maleic, hydrochloric, hydrobromic, succinic and the like. They may also be converted to quaternary ammonium salts by treatment with a reactive organic ester such as methyl iodide, ethyl bromide, methyl chloride, benzyl chloride, dimethyl sulfate, methyl toluenesulfonate and the like. The addition salts of the bases with acids have the same physiologic properties as the free bases and are equally desirable from a therapeutic point of view. It is understood that the appended claims read on the basically substituted fluorene compounds defined therein whether they be in the form of the free bases or salts thereof.

The following examples illustrate certain of the compounds to which this invention relates and practical processes of preparing the same. It is understood that these examples are given for purposes of illustration only, and do not limit the invention in spirit or in scope.

Example 1

208 parts of 2-acetylfluorene, 45 parts of paraformaldehyde, 105 parts of dimethylammonium chloride and 6 parts of hydrochloric acid are dissolved in 1500 parts of isopropanol. The solution is refluxed for 2½ hours. Upon chilling a heavy precipitate forms. This is removed and suspended in water and the mixture is made alkaline with caustic soda. The organic material is extracted with ether. The ether solution is filtered through a filter aid and dried with anhydrous potassium carbonate. To the ether solution is added an excess of alcoholic hydrogen chloride. The precipitated salt is collected on a filter and washed with alcohol-ether. The hydrochloride of 2-(beta-dimethylaminopropionyl)fluorene (Compound 2) thus obtained melts at 188–190° centigrade.

Example 2

208 parts of 2-acetylfluorene, 164 parts of diethylammonium chloride and 45 parts of paraformaldehyde are dissolved in 800 parts of isoamyl alcohol. The solution is refluxed for 15 minutes and cooled. A small amount of alcoholic hydrogen chloride is added to decompose unconsumed paraformaldehyde. A heavy precipitate of 2-(betadiethylaminopropionyl)fluorene hydrochloride forms. It is broken up, dried and dissolved in water. The aqueous solution is made alkaline with solid sodium carbonate and extracted with ether. The ether extract is washed with water and dried with anhydrous sodium sulfate. The residue obtained after evaporation of the ether is taken up in a small amount of ether, filtered with decolorizing charcoal and treated with alcoholic hydrogen chloride. The precipitate of the purified hydrochloride of 2-(beta-diethylaminopropionyl)fluorene (Compound 3) so isolated is collected on a filter, washed and dried. After recrystallization from isopropanol it melts at 164° C.

Example 3

260 parts of 2-(beta-diethylaminopropionyl)-fluorene (Example 2) are dissolved in ethanol. To the solution are added 40 parts of Raney nickel catalyst, 4 parts of chloroplatinic acid and 50 parts of 20% sodium hydroxide solution. The mixture is hydrogenated at low pressure (10 to 15 lb. p. s. i.) and room temperature. The theoretical amount of hydrogen is taken up in 20 minutes. Then the mixture is filtered and the filtrate evaporated. The residue is taken up in ether, dried and treated with an excess of alcoholic hydrogen chloride. A crystalline precipitate of the hydrochloride of 2-(gamma-diethylamino-alpha-hydroxypropyl)fluorene (Compound 4) forms. This is recrystallized from ethanol-ether and melts at 176° C. The mixed melting point with the hydrochloride of Compound 3 (Example 2) is depressed.

Example 4

111 parts of 2-propionylfluorene, 23 parts of paraformaldehyde and 53 parts of dimethylamine hydrochloride are dissolved in 800 parts of isopropyl alcohol. The solution is treated with 3 parts of hydrochloric acid and refluxed for one hour. The mixture is chilled and the precipitate of the hydrochloride of 2-(beta-dimethylaminoisobutyl)fluorene (Compound 6) is removed by filtration. It can be purified by recrystallization from 95% ethanol.

Example 5

104 parts of 2-acetylfluorene, 23 parts of paraformaldehyde and 34 parts of methylamine hydrochloride are dissolved in 500 parts of isopropanol and refluxed for 2 hours. The hydrochloride of 2-(beta-methylaminopropionyl)-fluorene (Compound 7) is isolated as in Example 1 and melts when pure at 218–220° C.

Example 6

208 parts of 2-acetylfluorene, 45 parts of paraformaldehyde and 182 parts of piperidine hydrochloride are dissolved in 800 parts of isoamyl alcohol and refluxed for 1½ hours. On chilling a heavy precipitate forms. This is removed, dissolved in water, made alkaline and extracted with ether. The ether extract is dried with anhydrous potassium carbonate, filtered and treated with an excess of hydrogen chloride in absolute alcohol. The precipitate of the hydrochloride of 2-(beta-piperidinopropionyl)-fluorene (Compound 8) is recrystallized from alcohol and melts at 212–214° C.

By a similar process, but using 185 parts of morpholine hydrochloride in place of the piperidene hydrochloride, there is prepared the hydrochloride of 2-(beta-morpholinopropionyl)fluorene (Compound 10). When pure this compound melts at 227–228° C. By catalytic hydrogenation as in Example 3 the ketone can be reduced to the carbinol (Compound 11).

Example 7

By a process similar to that of Example 2, but using 122 parts of ethylammonium chloride in place of the diethylammonium chloride, there is obtained the hydrochloride of 2-(beta-ethylaminopropionyl)fluorene (Compound 12). When recrystallized from alcohol diluted with a small amount of ether this compound melts at 226–228° C.

By catalytic hydrogenation of the above ketone, using Raney nickel activated with chloroplatinate at 50 lb. pressure in alcohol, there is obtained the corresponding carbinol (Compound 14).

Example 8

50 parts of 2-(beta-piperidinopropionyl)fluorene hydrochloride (Example 6) are dissolved in 500 parts of ethanol. The compound is reduced in the presence of platinum oxide, palladium sponge or palladium-charcoal catalysts at hydrogen pressures of 10–60 lb. and at temperatures of 20–65° C. When the hydrogen uptake reaches the calculated value, the catalyst is removed by filtration, the alcoholic solution is concentrated and ether is added to precipitate the hydrochloride of 2-fluorenyl-beta-piperidinoethyl-carbinol (Compound 15). The latter when purified by recrystallization from alcohol melts at 218–220° C.

Example 9

490 parts of cyclohexyl bromide are converted to the Grignard reagent with 84 parts of magnesium and 3000 parts of dry ether. To this solution are added 280 parts of 2-(beta-diethylaminopropionyl)fluorene (Example 2) in dry ether. The reaction mixture is refluxed for one hour and allowed to stand overnight. The mixture is decomposed with hydrobromic acid with cooling. A yellow solid forms which is removed by filtration. This is dried and recrystallized from isopropanol with decolorizing charcoal. The hydrobromide of 2-fluorenyl-cyclohexyl-beta-diethylaminoethyl-carbinol (Compound 16) thus obtained melts at 149–150° C. Its hydrochloride is prepared analogously and melts at 194–195° C. (with decomposition).

I claim:

1. A member of the group consisting of a basic compound of the formula

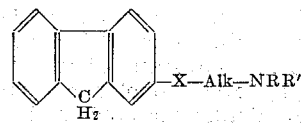

and salts thereof, wherein X is a methylene radical substituted with a radical selected from the group consisting of oxo and oxy radicals, Alk is a lower alkylene radical and R and R' are lower alkyl radicals.

2. A compound of the formula

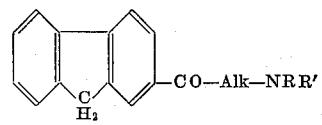

wherein Alk is a lower alkylene radical and R and R' are lower alkyl radicals.

3. A compound of the formula

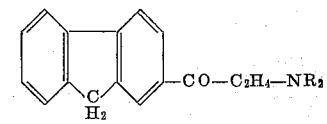

wherein R is a lower alkyl radical.

4. A compound of the formula

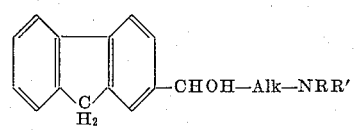

wherein Alk is a lower alkylene radical and R and R' are lower alkyl radicals.

5. A compound of the formula

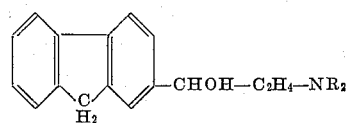

wherein R is a lower alkyl radical.

6. 2-($\beta$-dimethylaminopropionyl)fluorene.

7. 2-($\beta$-diethylaminopropionyl)fluorene.

8. 2-($\gamma$-diethylamino-$\alpha$-hydroxypropyl)fluorene.

9. The process for producing a 2-[$\beta$-di(lower alkyl)amino(lower alkanoyl)]fluorene which comprises heating to reflux a mixture of a 2-(lower alkanoyl)fluorene with about 1.2 to 1.5 equivalents of a di(lower alkyl)amine and about 1.2 to 1.5 equivalents of a source of formaldehyde in a lower aliphatic alcohol, and separating from the reaction mixture the product thus formed.

10. The process for producing a 2-[β-di(lower alkyl)amino(lower alkanoyl)]fluorene salt which comprises heating to reflux a mixture of a 2-(lower alkanoyl)fluorene with about 1.2 to 1.5 equivalents of a di(lower alkyl)amine salt and about 1.2 to 1.5 equivalents of a source of formaldehyde in a lower aliphatic alcohol, and separating from the reaction mixture the product thus formed.

11. The process for producing a 2-[β-di(lower alkyl)amino(lower alkanoyl)]fluorene hydrohalide which comprises heating to reflux a mixture of a 2-(lower alkanoyl)-fluorene with about 1.2 to 1.5 equivalents of a di(lower alkyl)amine hydrohalide and about 1.2 to 1.5 equivalents of paraformaldehyde in a lower aliphatic alcohol, and separating from the reaction mixture the product thus formed.

12. The process for producing a 2-[β-di(lower alkyl)aminopropionyl]fluorene hydrochloride which comprises heating to reflux a mixture of 2-acetylfluorene with about 1.2 to 1.5 equivalents of a di(lower alkyl)-amine hydrochloride and about 1.2 to 1.5 equivalents of paraformaldehyde in a lower aliphatic alcohol, and separating from the reaction mixture the product thus formed.

13. The process for producing 2-(β-diethylamino-propionyl)fluorene hydrochloride which comprises heating to reflux a mixture of 2-acetylfluorene with about 1.5 equivalents of diethylammonium chloride and about 1.5 equivalents of paraformaldehyde in isoamyl alcohol, and separating the product thus formed from the reaction mixture.

JOHN W. CUSIC.

REFERENCES CITED

The following references are of record in the file of this patent:

UNITED STATES PATENTS

| Number | Name | Date |
|---|---|---|
| 1,749,361 | Stuart | Mar. 4, 1930 |
| 2,280,058 | Bruson | Apr. 21, 1942 |

OTHER REFERENCES

Adams et al., "Organic Reactions" (John Wiley, 1942), vol. 1, pp. 303–341.

Bielschowsky et al., "Nature," vol. 149, pp. 526–527 (1942).

Ray et al., "J. Am. Chem. Soc.," vol. 69, pp. 587–589 (1947).

Certificate of Correction

Patent No. 2,527,798                                                          October 31, 1950

JOHN W. CUSIC

It is hereby certified that error appears in the printed specification of the above numbered patent requiring correction as follows:

Column 4, line 41, for "betadiethylaminopropionyl" read *beta-diethylaminopropionyl*; line 63, for "10 to 15" read *10 to 50*;

and that the said Letters Patent should be read as corrected above, so that the same may conform to the record of the case in the Patent Office.

Signed and sealed this 26th day of December, A. D. 1950.

[SEAL]

THOMAS F. MURPHY,
*Assistant Commissioner of Patents.*